(12) United States Patent
Auch et al.

(10) Patent No.: US 11,656,960 B2
(45) Date of Patent: May 23, 2023

(54) DISASTER RESILIENT FEDERATED KUBERNETES OPERATOR

(71) Applicant: SAP SE, Walldorf (DE)

(72) Inventors: Nathan Auch, Waterloo (CA); Ivan Bowman, Halifax (CA); Daniel Kirmse, Berlin (DE); Henning Zahn, Muehlenbeck (DE)

(73) Assignee: SAP SE, Walldorf (DE)

( * ) Notice: Subject to any disclaimer, the term of this patent is extended or adjusted under 35 U.S.C. 154(b) by 120 days.

(21) Appl. No.: 17/205,245

(22) Filed: Mar. 18, 2021

(65) Prior Publication Data

US 2022/0300386 A1 Sep. 22, 2022

(51) Int. Cl.
| | |
|---|---|
| *G06F 11/20* | (2006.01) |
| *G06F 9/54* | (2006.01) |
| *H04L 67/10* | (2022.01) |
| *H04L 67/2866* | (2022.01) |

(52) U.S. Cl.
CPC .......... *G06F 11/2025* (2013.01); *G06F 9/547* (2013.01); *H04L 67/10* (2013.01); *H04L 67/2866* (2013.01); *G06F 2201/805* (2013.01)

(58) Field of Classification Search
CPC .. G06F 11/3688; G06F 9/44505; H04L 67/10; H04L 67/34
See application file for complete search history.

(56) References Cited

U.S. PATENT DOCUMENTS

| | | | | |
|---|---|---|---|---|
| 9,785,412 | B1* | 10/2017 | Huynh Van | H04L 41/0233 |
| 2019/0220331 | A1* | 7/2019 | Duggal | G06F 9/5072 |
| 2021/0132981 | A1* | 5/2021 | Thakkar | H04L 67/10 |
| 2021/0200600 | A1* | 7/2021 | Thakkar | G06F 9/5027 |
| 2022/0019519 | A1* | 1/2022 | Gann | G06F 11/3688 |
| 2022/0237017 | A1* | 7/2022 | Kim | G06F 9/5077 |

OTHER PUBLICATIONS

Angel, J. et al., "Service," accessed at https://kubernetes.io/docs/concepts/services-networking/service/#headless-services accessed on Feb. 17, 2020; 31 pages, The Kubernetes Authors, The Linux Foundation.

* cited by examiner

*Primary Examiner* — Mahran Y Abu Roumi
(74) *Attorney, Agent, or Firm* — Sterne, Kessler, Goldstein & Fox P.L.L.C.

(57) ABSTRACT

Disclosed herein are system, method, and computer program product embodiments for disaster resilience of applications managed by Kubernetes operators. An embodiment operates by creating an orchestration and worker cluster, where the worker cluster is coupled to the orchestration cluster by a proxy server. Custom resources are deployed to the orchestration cluster and custom resource controllers are deployed to the worker cluster. The proxy server federates these custom resources between the orchestration cluster and the worker cluster. During disasters, the worker cluster is recreated and reconciled to prevent loss of the federated cluster.

18 Claims, 6 Drawing Sheets

DISASTER RESILIENT FEDERATED KUBERNETES OPERATOR

BACKGROUND

One important trait of cloud offerings is their very high availability and continuity. However, when using Kubernetes as a platform for a cloud offering, it becomes a single point of failure when configured as a single Kubernetes cluster. When the cluster faces disaster, both the metadata, of which customer systems actually were provisioned, as well as the customer systems themselves are lost. Recreating the Kubernetes cluster from a backup comes with a considerable delay and potential loss of data depending on the frequency of cluster state backups.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for disaster resilience of applications managed by Kubernetes operators.

Kubernetes® is an open-source container-orchestration system for automating computer application deployment, scaling, and management. It aims to provide a platform for automating deployment, scaling, and operations of application containers across clusters of hosts. It works with a range of container tools and runs containers in a cluster.

Many cloud services offer a Kubernetes-based platform or infrastructure as a service PaaS (Platform as a Service) or IaaS (Infrastructure as a Service) on which Kubernetes can be deployed as a platform-providing service.

Kubernetes defines a set of building blocks ("primitives"), which collectively provide mechanisms that deploy, maintain, and scale applications based on CPU, memory or custom metrics. Kubernetes is loosely coupled and extensible to meet different workloads. This extensibility is provided in large part by the Kubernetes API (application programming interface), which is used by internal components as well as extensions and containers that run on Kubernetes. The platform exerts its control over computer and storage resources by defining resources as Objects, which can then be managed as such.

The components of Kubernetes can be divided into those that manage an individual node and those that are part of the control plane. The Kubernetes master is the main controlling unit of the cluster, managing its workload and directing communication across the system. The Kubernetes control plane consists of various components, each its own process, which can run both on a single master node and on multiple masters supporting high-availability clusters.

The technology described herein provides federation of "custom resources" between an "orchestration cluster" and a "worker cluster", where the custom resources are deployed to the orchestration cluster, and Kubernetes custom resource controllers (operators) are deployed to worker clusters. Federated architecture (FA) is a pattern in enterprise architecture that allows interoperability and information sharing between semi-autonomous de-centrally organized information technology systems and applications.

Figure 1:
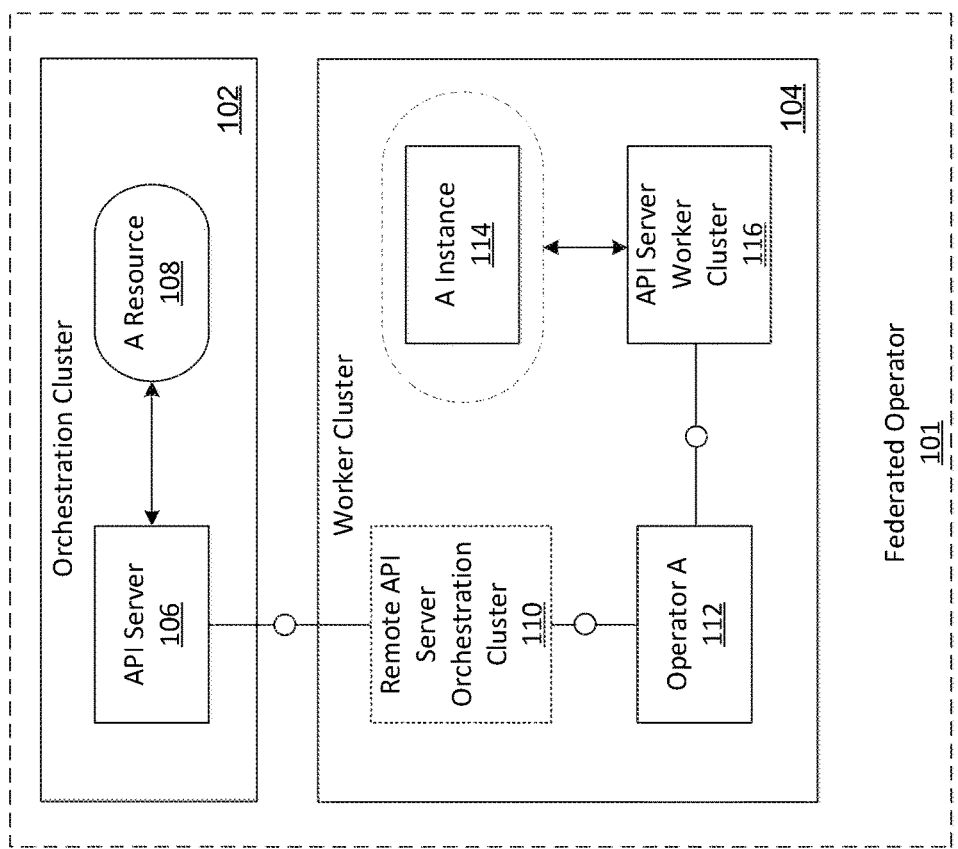
FIG. 1 is a block diagram of a federated operator architecture, according to some embodiments.

FIG. 1 is a cloud-based platform 100 for federating custom resources between an orchestration cluster 102 and a worker cluster 104, according to an embodiment. Cloud-based platform 100 can be performed by processing logic that can comprise hardware (e.g., server processors, circuitry, dedicated logic, programmable logic, microcode, etc.), software (e.g., instructions executing on a processing device), or a combination thereof. It is to be appreciated that not all elements may be needed to perform the disclosure provided herein.

The federated operator architecture 101, as described in the various embodiments, includes both an orchestration cluster and a worker cluster. The orchestration cluster works at the edge of a plurality of clusters. As such, it runs an edge layer of a cloud offering. It also hosts the custom resources that represent the entities a customer could provision. However, it does not host any derived custom or Kubernetes resources.

Federation is implemented with a Kubernetes API proxy server in the worker cluster, which exposes the custom resources to the worker cluster. This single cluster setup runs all components in one Kubernetes cluster. An operator running in the worker cluster does not access the orchestration cluster API server directly, and therefore is not aware that an orchestration cluster exists at all.

Orchestration cluster 102 may include an API server 106 (e.g., Kubernetes API Server) and a resource (A resource) 108. The API server 106 is a lightweight Web application that allows users to create and expose data APIs from data, without the need for custom development. Most web APIs sit between the application and the web server. The user initiates an API call that tells the application to do something, then the application will use an API to ask the web server to do something. The API is the middleman between the application and the web server, and the API call is the request. The resource 108 (cluster resource) is an entity of a Kubernetes Custom Resource Definition (CRD), which is a general Kubernetes extension mechanism used to add extensions to the Kubernetes API. A CRD would extend the Kubernetes API by resources (i.e., metadata descriptions) tailor-made to describe various relational database management systems. In that sense, 108 represents the metadata of a cloud resource which will be used by Operator A 112 to create A Instance 114.

Worker cluster 104 may include Remote API Server 110 (proxy for the orchestration cluster), such as a Kubernetes API proxy server. This Remote API Server 110 is deployed to the worker cluster which establishes a port-forwarding to orchestration cluster API server 106.

There are no Kubernetes custom resource controllers (operators) deployed in the orchestration cluster 102. In various embodiments, the orchestration cluster 102 does not know about the worker cluster 104. The worker cluster hosts the operators (e.g., operator 112) for the custom resources 108 (A Resource) and the instance 114 (A Instance) created from the metadata provided by custom resources 108. Operators need to register themselves with the API server 106 to reconcile their custom resources. As soon as a custom resource is created by the API server 106, the previously registered operator 112 will receive a notification to reconcile the custom resource modification.

The operator 112 reconciles its custom resources, which it receives from the proxy API server 110 and it uses an API server 116 of the worker cluster to create and manage any potential child resources needed.

Figure 2:
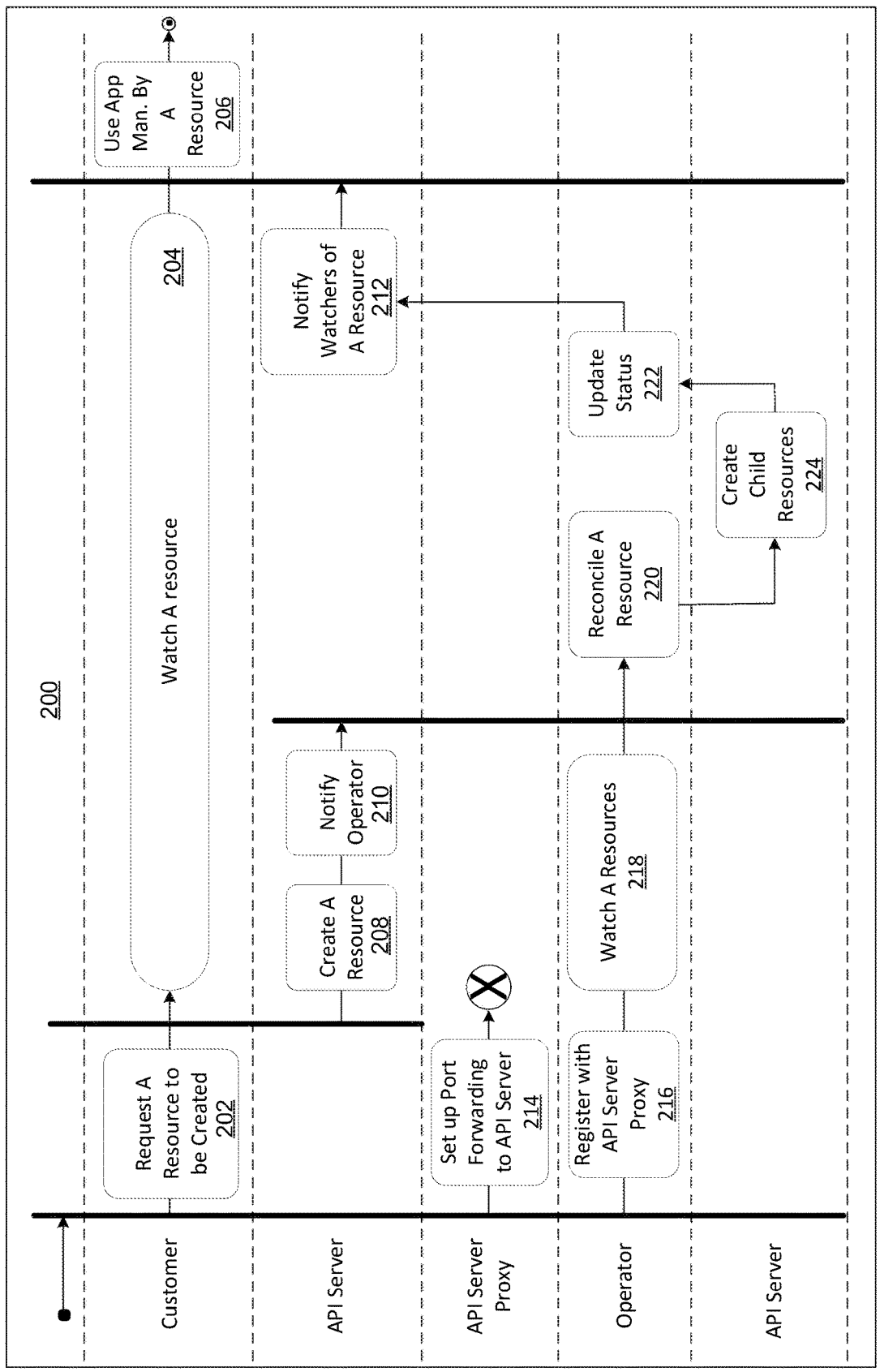
FIG. 2 is a flowchart illustrating a timeline for provisioning workflow for federated custom resources, according to some embodiments.

FIG. 2 is a flowchart illustrating a process for provisioning workflow for federated custom resources, according to some embodiments.

Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Prior to provisioning federated customer resources, the previously described Federated Operator architecture (system) includes an Orchestration Cluster and a Worker Cluster. API Server Proxy in the Worker Cluster establishes, via a networking rule, to route requests sent to its address to the actual API Server of the Orchestration cluster. Operators use the API Server Proxy address to establish watches 204 on the "A Resource" resource kind in the Orchestration cluster.

The provisioning workflow begins in step 202, where the system, via a user interface (UI) or API, receives a customer request to provision a cloud computing resource, such as a relational database system. In response, in step 208, the API Server creates a custom resource, such as a Kubernetes custom resource (a representation of the customer's request via metadata describing the cloud computing resource), identified as an "A Resource" in the Orchestration Cluster.

In step 210, the API Server notifies all watchers registered for resources of created "A Resource". For example, all watchers are made aware of a change to the metadata contained in a resource, such as A Resource 108.

In step 214, the API Proxy Server sets up a port forwarding to the API server to provide a communications conduit between the worker cluster and the orchestration cluster. For example, the API Server Proxy in the Worker Cluster establishes, via a networking rule, to route requests sent to its address to the actual API Server of the Orchestration cluster In step 216, an Operator registers with the API proxy server in the worker cluster.

In step 218, the Operator watches resources of kind "A Resource".

In step 220, the Operator starts reconciling, thus creating the system as requested or modifying the system according to changes in the metadata (i.e., configuration).

In step 224, the Operator creates new Kubernetes resources in worker cluster by interacting with the API Server deployed in the worker cluster. These newly created resources belong to the system requested, e.g., Persistent Volume Claims, Networking rules, Deployments (Pods).

In step 222, the Operator reports a status of the reconciliation in the status section of the resource "A Resource" via API Server Proxy. The API Server updates the resource of kind "A Resource" representing the system in Orchestration cluster.

In step 212, the API Server in the Orchestration cluster performs the status update of "A Resource" and notifies watchers.

In step 206, the UI or API will report to the customer about progress and result of the operation.

Figure 3:
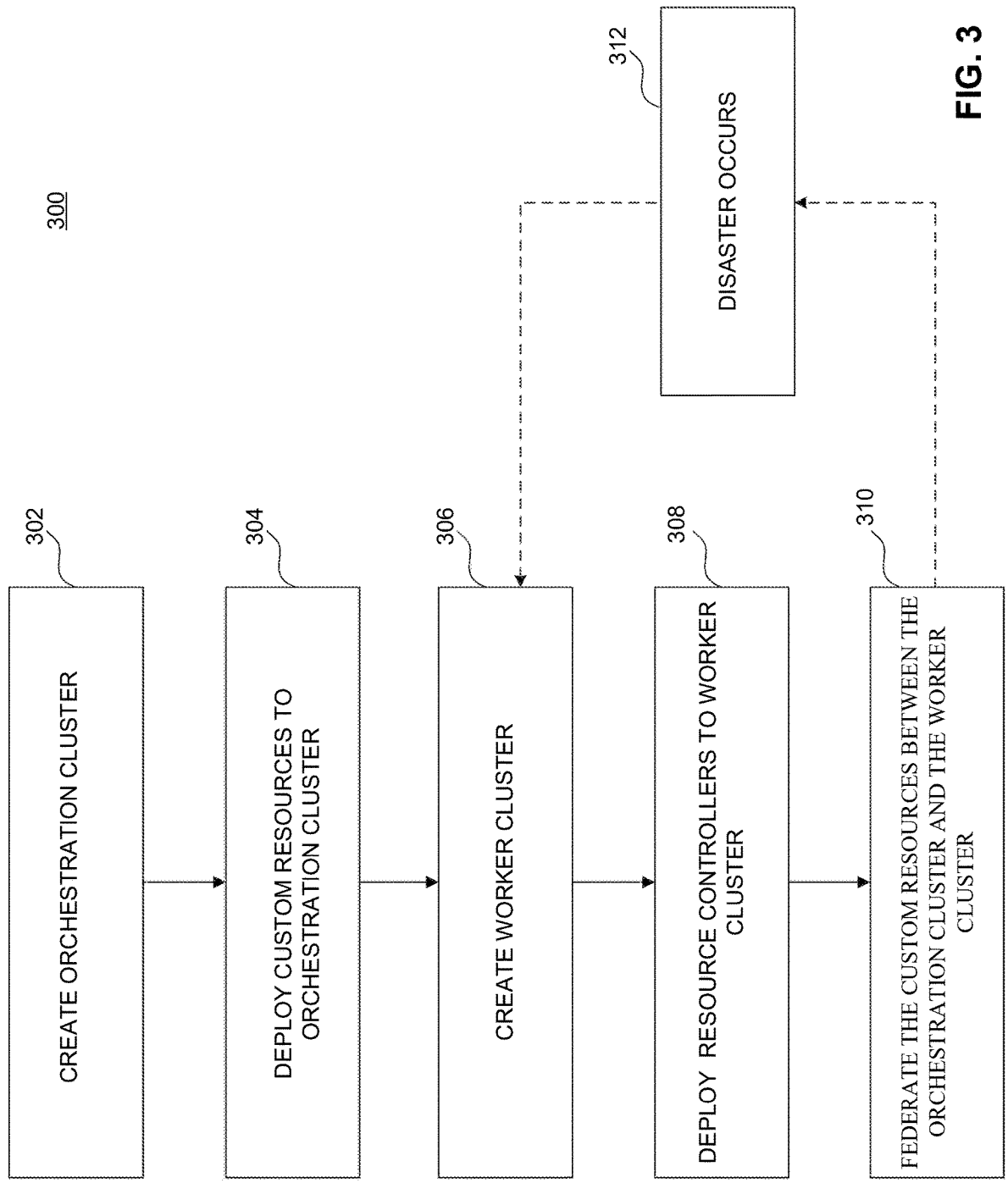
FIG. 3 is a flowchart illustrating a process for disaster recovery, according to some embodiments.

FIG. 3 is a flowchart illustrating a process for disaster recovery, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

In step 302, the system creates an orchestration cluster and deploys, in step 304, custom resources to the orchestration cluster. Custom resources 108 like "A Resource" are typically deployed at runtime when a customer wants to provision an actual system.

In step 306, the system creates a worker cluster coupled to the orchestration cluster, the worker cluster including at least a proxy server to proxy communications between the worker cluster and the orchestration cluster.

In step 308, the system deploys custom resource controllers to the worker cluster.

In step 310, the proxy server executes federation of the custom resources between the orchestration cluster and the worker cluster.

If a disaster occurs (e.g., power outage, weather emergency, hardware failures, etc.), in step 312, the worker cluster is recreated, followed by the deployment of custom resource controllers 308 to the worker cluster and federation 310 between the Worker and Orchestration clusters (by initiating the proxy server port forwarding).

Figure 4A:
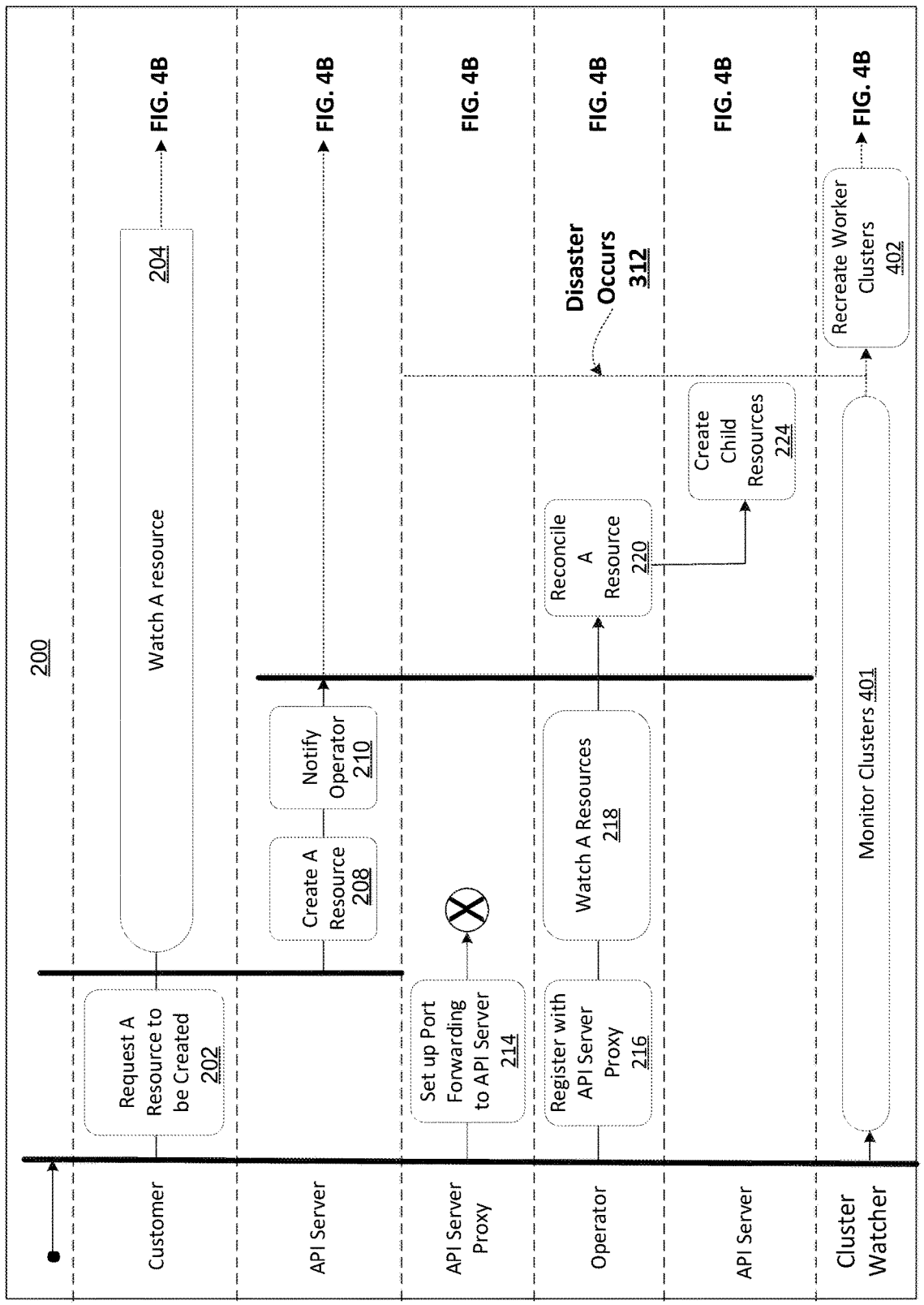
FIG. 4A is a flowchart illustrating a timeline for disaster recovery, according to some embodiments.
Figure 4B:
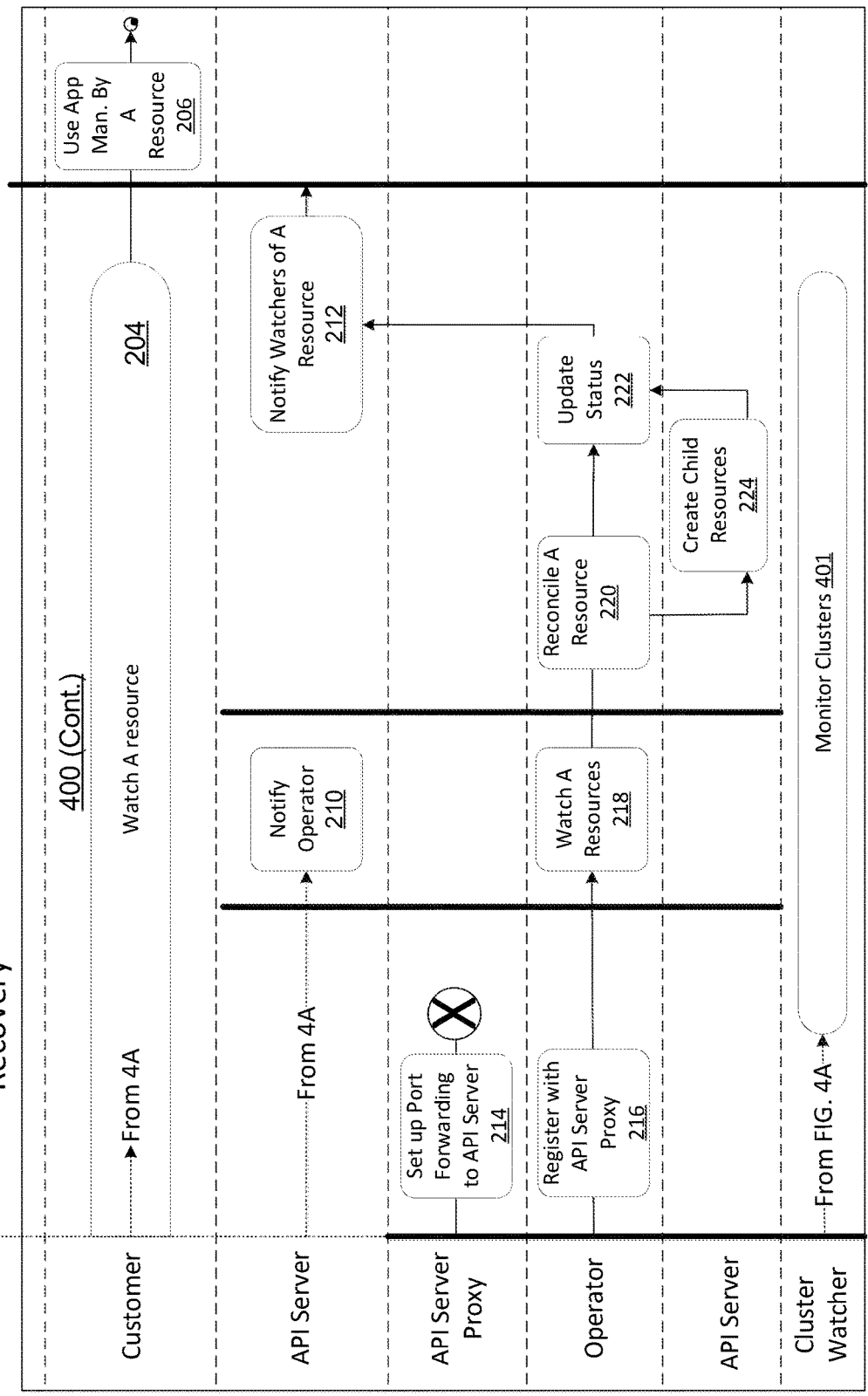
FIG. 4B is a flowchart illustrating a continuation timeline for disaster recovery, according to some embodiments.

FIG. 4A is a flowchart illustrating a process for disaster recovery, according to some embodiments. FIGS. 4A and 4B illustrate the provisioning workflows of FIG. 2, but with disaster recovery.

Consider the workflows for provisioning and update as previously described in association with FIGS. 1-3. There are resources of kind "A Resource" present in Orchestration cluster 102. There are customer systems provisioned and running in the worker cluster 104. When a disaster occurs 312 that destroys the worker cluster, customer systems in that cluster are lost. However, the Kubernetes resources defining these systems are still present in the orchestration cluster. Therefore, as a first step in disaster recovery, a cluster watcher (monitor clusters 401) recreates the worker cluster(s) 402 and proceeds to reconcile the operators as shown in FIG. 4B. Recreation of the worker cluster will reestablish the setup previously described in the provisioning workflow of FIG. 2.

FIG. 4B is a flowchart illustrating a process for a continuation timeline (from FIG. 4A) for disaster recovery, according to some embodiments.

As the orchestration cluster remains intact, the original workflows of the customer and API Server 106 continue (from 4A). However, port forwarding from the proxy server is initiated 214 with operators registered with the proxy server. However, since there are no customer systems present in a worker cluster after its recreation (402), the operator in the recreated worker cluster will immediately start reconciling 220 the resources of kind "A Resource" and thus will recreate all customer systems in the worker cluster. The workflow subsequently continues as previously described in association with FIG. 2 provisioning.

In one alternate embodiment, the system could separately start an automatic recovery of these systems from their backed up data. However, when the worker cluster recreation is performed automatically, no human interaction is required to rebuild the customer systems.

The technology described in the various embodiments has many advantages. For example, when a Kubernetes worker cluster gets destroyed, the workload scheduled there would automatically reappear, when a new worker cluster is available. This would include a downtime of the applications. Also, when the Kubernetes Orchestration Cluster gets destroyed, the workload in the Worker Cluster is not affected. There is no downtime for these applications. However, the ability to accept any changes at Custom Resources would be disrupted. In addition, this technology opens up for more advanced scheduling concepts.

Also, this approach has architectural advantages: highly decoupled architecture, the operator only talks to services within the worker cluster it is deployed to; the operator is agnostic to the actual cluster hosting the resources it is reconciling due to the headless service when the worker cluster disappears, and an operator in a recreated worker cluster picks up the Custom Resources still existing in the orchestration cluster.

And finally, the approach differs from the single cluster approach by not requiring a backup of the cluster state to be available for recovery from disaster and preventing loss of metadata as well as running applications during disaster.

Figure 5:
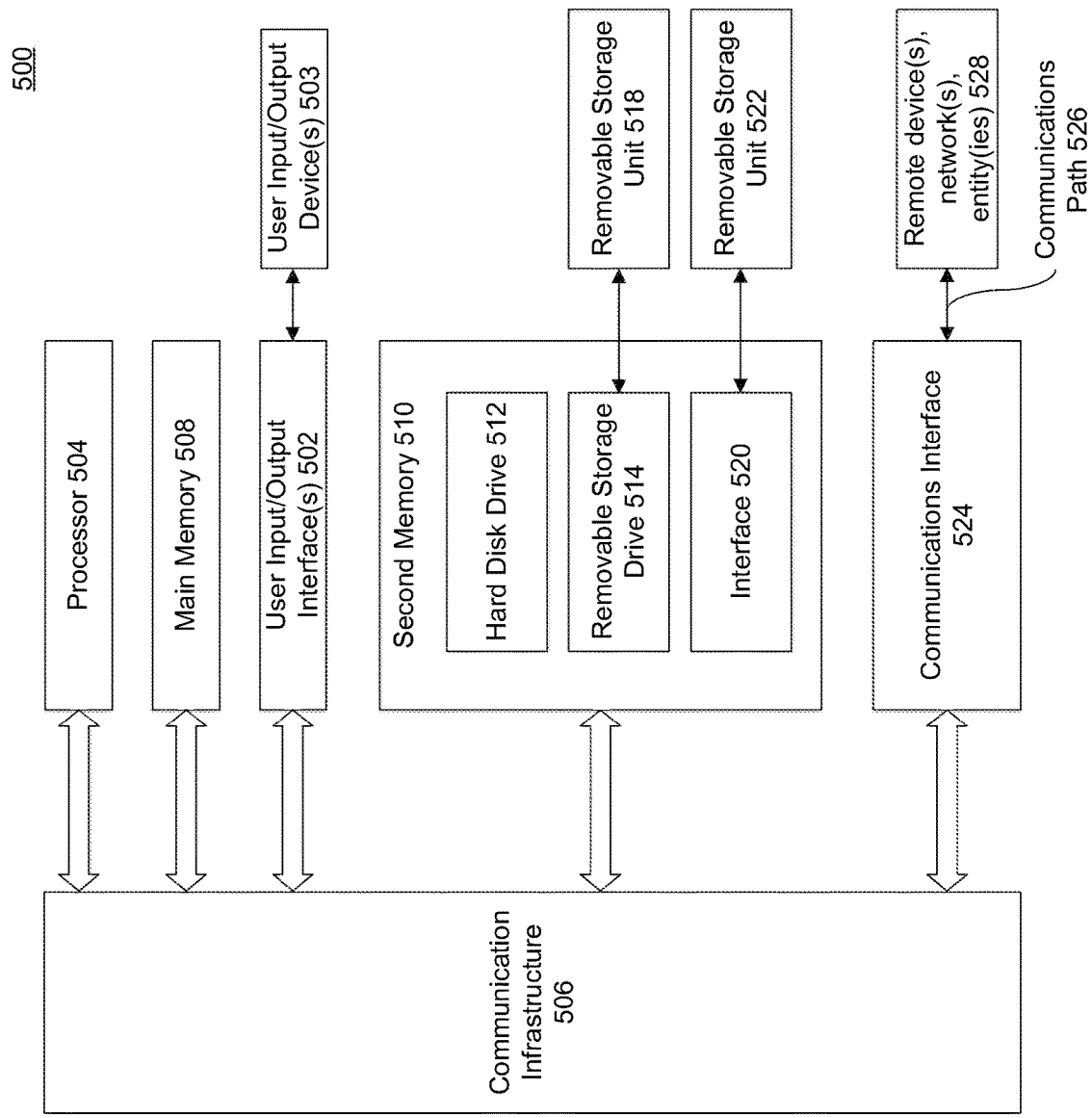
FIG. 5 is an example computer system useful for implementing various embodiments.

FIG. 5 is an example computer system useful for implementing various embodiments. Various embodiments can be implemented, for example, using one or more computer systems, such as computer system 500. Computer system 500 can be used, for example, to implement method 300 or any other embodiments described herein. For example, computer system 500 can federate custom resources between an orchestration cluster and a worker cluster. Computer system 500 can further provide server proxy services in a worker cluster, according to some embodiments. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for cloud processing, comprising:
    creating, by a cloud system, an orchestration cluster, wherein the orchestration cluster includes at least a first application programming interface (API) server;
    deploying, by the cloud system, custom resources to the orchestration cluster;
    creating, by the cloud system, a worker cluster, wherein the worker cluster includes at least a proxy server for watching the orchestration cluster, wherein the orchestration cluster does not know about the worker cluster, and wherein the proxy server is configured to detect, through the watching, a change to metadata associated with the worker cluster;
    deploying, by the cloud system, resource controllers and a second API server to the worker cluster;
    executing, by the proxy server, federation of the custom resources between the orchestration cluster and the worker cluster;
    determining that the worker cluster has become unavailable and the orchestration cluster remains operational, wherein the orchestration cluster includes Kubernetes resources defining the unavailable worker cluster;
    recreating the worker cluster responsive to determining that the worker cluster has become unavailable;
    initiating port forwarding to the first API server to provide communications between the recreated worker cluster and the orchestration cluster; and
    registering the resource controllers with the proxy server to reconcile the custom resources;
    wherein at least one of the creating, deploying, and executing are performed by one or more computers.

2. The computer implemented method of claim 1, wherein the first API server comprises a Kubernetes API server.

3. The computer implemented method of claim 1, further comprising:
    establishing port-forwarding from the proxy server to the first API server.

4. The computer implemented method of claim 1, wherein the proxy server comprises a Kubernetes API proxy server.

5. The computer implemented method of claim 1, wherein the resource controllers comprise Kubernetes resource operators.

6. The computer implemented method of claim 5, further comprising:
    registering the Kubernetes resource operators with the first API server.

7. A system, comprising:
    a memory; and
    at least one processor coupled to the memory and configured to:
        create an orchestration cluster;
        deploy custom resources to the orchestration cluster;
        create a worker cluster coupled to the orchestration cluster, the worker cluster including watching the orchestration cluster, wherein the orchestration cluster does not know about the worker cluster, and wherein the proxy server is configured to detect, through the watching, a change to metadata associated with the worker cluster;
        deploy resource operators to the worker cluster; and
        federate the custom resources between the orchestration cluster and the worker cluster;
        determine that the worker cluster has become unavailable and the orchestration cluster remains operational, wherein the orchestration cluster includes Kubernetes resources defining the unavailable worker cluster;
        recreate the worker cluster responsive to determining that the worker cluster has become unavailable;
        initiate port forwarding to the first API server to provide communications between the recreated worker cluster and the orchestration cluster; and
        register the resource controllers with the proxy server to reconcile the custom resources.

8. The system of claim 7, the at least one processor further configured to:
    deploy a first application programming interface (API) server to the orchestration cluster.

9. The system of claim 8, wherein the first API server comprises a Kubernetes API server.

10. The system of claim 8, wherein the at least one processor is further configured to:
    deploy a second API server to the worker cluster.

11. The system of claim 7, wherein the at least one processor is further configured to:

deploy a proxy server to the worker cluster, wherein the proxy server provides the communications with the orchestration cluster.

12. The system of claim 11, wherein the proxy server comprises a Kubernetes application programming interface (API) proxy server.

13. The system of claim 11, wherein the at least one processor is further configured to: register the resource operators with the proxy server to reconcile the custom resources.

14. A non-transitory computer-readable device having instructions stored thereon that, when executed by at least one computing device, cause the at least one computing device to perform operations comprising:
creating an orchestration cluster;
deploying custom resources to the orchestration cluster;
creating a worker cluster, wherein the worker cluster includes at least a proxy server for watching the orchestration cluster, wherein the orchestration cluster does not know about the worker cluster, and wherein the proxy server is configured to detect, through the watching, a change to metadata associated with the worker cluster;
deploying custom resource controllers to the worker cluster;
executing federation of the custom resources between the orchestration cluster and the worker cluster;
determining that the worker cluster has become unavailable and the orchestration cluster remains operational, wherein the orchestration cluster includes Kubernetes resources defining the unavailable worker cluster;
recreating the worker cluster responsive to determining that the worker cluster has become unavailable;
initiating port forwarding to the first API server to provide communications between the recreated worker cluster and the orchestration cluster; and
registering the resource controllers with the proxy server to reconcile the custom resources.

15. The non-transitory computer-readable device of claim 14, the operations further comprising, in response to a disaster related loss of the worker cluster:
recreating the worker cluster;
initiating communications between the orchestration cluster and the worker cluster; and
registering the custom resource controllers with the worker cluster to reconcile the custom resources.

16. The non-transitory computer-readable device of claim 14, the operations further comprising:
for the communications, establishing a port-forwarding from the worker cluster to the orchestration cluster.

17. The non-transitory computer-readable device of claim 14, the operations further comprising:
for the communications, establishing a port-forwarding from a proxy server of the worker cluster to the orchestration cluster.

18. The non-transitory computer-readable device of claim 14, the operations further comprising:
registering the custom resource controllers with the orchestration cluster.

* * * * *